United States Patent

Marquis et al.

Patent Number: 5,363,915
Date of Patent: Nov. 15, 1994

[54] ENHANCED OIL RECOVERY TECHNIQUE EMPLOYING NONIONIC SURFACTANTS

[75] Inventors: David M. Marquis, Lafayette; Donald L. Kuehne, Hercules, both of Calif.

[73] Assignee: Chevron Research and Technology Company, San Francisco, Calif.

[21] Appl. No.: 546,841

[22] Filed: Jul. 2, 1990

[51] Int. Cl.⁵ .................................................. E21B 43/22
[52] U.S. Cl. ...................................... 166/274; 166/275
[58] Field of Search ................. 166/273, 274, 275, 268, 166/309

[56] References Cited

U.S. PATENT DOCUMENTS

| | | | |
|---|---|---|---|
| 3,700,031 | 10/1972 | Germer, Jr. et al. | 166/273 X |
| 4,034,809 | 7/1977 | Phillips et al. | 166/275 X |
| 4,138,345 | 2/1979 | Williams | 166/274 X |
| 4,175,618 | 11/1979 | Wu et al. | 166/273 X |
| 4,288,334 | 9/1981 | McCoy et al. | 166/275 X |
| 4,353,806 | 10/1982 | Canter et al. | 166/274 X |
| 4,360,061 | 11/1982 | Canter et al. | 166/274 |
| 4,391,719 | 7/1983 | Meister | 166/274 X |
| 4,393,936 | 7/1983 | Josendal | 166/274 X |
| 4,432,881 | 2/1984 | Evani | 166/275 X |
| 4,434,062 | 2/1984 | Oswald et al. | 166/274 X |
| 4,502,538 | 3/1985 | Wellington et al. | 166/274 X |
| 4,505,828 | 3/1985 | Lipowski et al. | 166/275 X |
| 4,686,053 | 8/1987 | Baviere et al. | 166/275 X |
| 4,738,789 | 4/1988 | Jones | 166/275 X |
| 4,814,096 | 3/1989 | Evani | 166/270 X |
| 4,828,029 | 5/1989 | Irani | 166/274 X |

Primary Examiner—William P. Neuder
Attorney, Agent, or Firm—Burns, Doane, Swecker & Mathis

[57] ABSTRACT

A method for enhancing the recovery of petroleum from an oil bearing formation during injection of a non-condensible gas comprises the at least periodic injection of a foam forming composition or a preformed foam into the reservoir. The foam which is produced comprises a mixture of a non-condensible gas, water and a non-ionic surfactant. The non-ionic surfactants which can be employed in the present invention are those non-ionic surfactants which have a HLB value of about 14 to less than 20, preferably 15-18, and which provide a stable foam when the surfactant is mixed with brine and/or water and a non-condensible gas. The method is preferably employed within a light oil bearing carbonate formation.

28 Claims, 2 Drawing Sheets

ENHANCED OIL RECOVERY TECHNIQUE EMPLOYING NONIONIC SURFACTANTS

BACKGROUND OF THE INVENTION

The present invention relates to a method of enhancing recovery of petroleum from an oil bearing formation. In particular, the invention relates to the use of non-ionic surfactants in an enhanced oil recovery operation for the recovery of light oils from carbonate formations.

In the recovery of light oils (i.e., greater than 20° API) from reservoirs, the use of primary production techniques (i.e., use of only the initial formation energy to recover the crude oil), followed by the secondary technique of waterflooding, recovers only about 60 to 70% of the original oil present in the formation.

Moreover, the use of certain enhanced oil recovery (EOR) techniques is also known within the art. These techniques can be generally classified as either a thermally based recovery methods, i.e., utilizing steam, or a gas-drive method that can be operated under either miscible or non-miscible conditions.

The gases which are commonly employed in gas-drive methods are those normally referred to as non-condensible gases, for example, nitrogen, carbon dioxide, methane, mixtures of methane with ethane, propane, butane, and higher hydrocarbon homologues. This class of gases include both natural gas and produced gas. Moreover, these include both "lean" gases, e.g., methane alone, or "rich" gases, e.g., methane mixed with ethane or the like.

For a given crude oil and temperature, the non-condensible gases become miscible with the oil above a pressure known as the minimum miscibility pressure. Above this pressure, these "non-condensible" gases attain a supercritical state wherein their behavior has characteristics of both gases and liquids.

With those enhanced recovery processes which employ non-condensible gases under miscible conditions, the oil can be caused to flow toward a producing well because the non-condensible gas "swells" the oil (i.e., increases the volume by dissolving in the oil) and, thus, reduces the viscosity of the oil.

The method of the present invention is preferably directed to this miscible operation although it is equally effective under non-miscible conditions.

A typical procedure involves injecting a slug of $CO_2$ followed by the injection of a higher viscosity fluid such as water to "push" the $CO_2$. See, for example, the discussion in U.S. Pat. No. 2,623,596. Moreover, U.S. Pat. No. 3,065,790 indicates that this process may be more cost effectively employed if a relatively small slug of $CO_2$ is injected ahead of a drive fluid. In fact, as illustrated by U.S. Pat. No. 3,529,668, this type of recovery procedure is typically performed in "water alternating gas (WAG)" cycles.

Because of the viscosity and density differences between the $CO_2$ and the oil (i.e., $CO_2$ has only 5 to 10% of the viscosity of, e.g., light oil), the $CO_2$ tends to bypass much of the oil when flowing through the pores of the rock reservoir.

One proposed solution to this problem associated with the bypassing of the $CO_2$ has been through the use of a small amount of water which contains a surfactant, with the $CO_2$. In particular, a surfactant has been proposed as a means for generating a foam or an emulsion in the formation. See, for example, U.S. Pat. No. 4,380,266 to Wellington and U.S. Pat. No. 5,502,538 to Wellington et al. Each of these foams or emulsions is composed of a non-condensible gas, such as $CO_2$, and water which contains a surfactant.

The purpose of this foam is to inhibit the flow of the $CO_2$ into that portion of the formation containing only residual oil saturation. In addition, the foam physically blocks the volumes through which $CO_2$ is short-cutting. This forces the $CO_2$ to drive the recoverable hydrocarbons from the less depleted portions of the reservoir toward the production well.

However, a number of problems have been encountered in attempting to provide an economical process. First of all, as clearly discussed within U.S. Pat. No. 4,380,266, the use of traditional surfactants, such as ethoxy-sulfates (particularly Alipal CD 128 supplied by GAF Corp.), suffers from problems associated with the instability of the foam produced in this environment. In the Society of Petroleum Engineers paper SPE 14394 (Las Vegas, Nev., Sep. 22–25, 1985), Borchardt, et. al. summarize evaluation of over 40 surfactants for use in $CO_2$ foam flooding. Thus, while certain surfactants have been suggested for use in this manner, the art has been largely unable to provide a stable foam in this environment.

In particular, when using a non-condensible gas under miscible conditions, the creation of an effective foam is very difficult because either the salt concentration of the water in the formation (connate or injected brine), the residual oil in the reservoir, or the chemical instability of surfactants tends to break the foam or even prevent the foam from forming.

Another problem with the use of non-condensible gases such as $CO_2$ is the undesirable and uneconomically high adsorption of surfactant onto formation rock. This is a particular problem with respect to systems which employ non-condensible gases such as $CO_2$ when compared to steam drive methods, due to the fact that adsorption occurs at much lower levels in the higher temperature environment associated with steam as compared to the relatively low temperatures normally encountered in many light oil reservoirs amenable to miscible gas flooding. In other words, adsorption increases as the temperature is lowered.

Further in this regard, the art has employed anionic surfactants as foaming agents within enhanced recovery techniques such as $CO_2$ flooding of oil formations made of sandstone and/or silica. Because the sandstone has a negative charge, the anionic surfactants are not appreciably adsorbed in the surrounding formation.

However, within a carbonate environment, which comprises primarily carbonate rock having a positive charge, the above described adsorption is effectively reversed. Thus, anionic surfactants are subject to uneconomically high adsorption losses to the formation rock (i.e. greater than about 0.5 mg/g of rock). Accordingly, anionic surfactants are not economically employable within this environment.

Alternative surfactants have failed to provide an economic solution to the above problem. For example, amphoteric surfactants, i.e., those surfactants which include both a positive and negative charge in the molecule, also suffer from high adsorption losses and thus they too are not economically feasible.

Furthermore, non-ionic surfactants, which do not suffer from the above adsorption problems associated with anionic surfactants, have been repeatedly dismissed by the art due to their "low foaming" reputation.

The hydrophilic-lipophilic balance (HLB) value is a measure of a surfactants ability to make oil-water emulsions. A non-ionic surfactant having a low HLB value (i.e., less than about 10) is considered oil soluble while a high HLB value (i.e., greater than about 13) are associated with water soluble surfactants. The non-ionic surfactants predominantly employed in car washes, dishwashers, and the like, have an HLB value of preferably about 13–15, most preferably about 13.

However, the need still exists for a surfactant which provides a stable foam and which can be economically employed in carbonate environments.

Accordingly, it is an object of the present invention to provide a foam-forming composition containing a non-ionic surfactant which does not exceedingly adsorb on the surrounding carbonate rock and which provides a stable foam during miscible gas flooding of the formation.

This and further objects will become apparent from the specification and claims which follow.

SUMMARY OF THE INVENTION

In accordance with the foregoing objectives, the present invention relates to a method for enhancing the recovery of petroleum. In particular, the present invention relates to a method for enhancing recovery of petroleum from an oil bearing formation during injection of a non-condensible gas comprising at least periodically injecting a foam comprising a non-ionic surfactant, water and the non-condensible gas into the formation. This foam is preferably preformed on the surface or in the well tubing.

In another aspect, the present invention relates to a method for enhancing recovery of petroleum from an oil bearing formation during injection of a non-condensible gas comprising the at least periodic injection of a foam-forming composition into the oil bearing formation.

The foam-forming composition employed in the present invention comprises a non-ionic surfactant, preferably in admixture with water, wherein the surfactant is present in an amount effective to form a stable foam upon mixing of the foam-forming composition with a non-condensible gas and water.

The non-ionic surfactants which can be employed in the present invention are those non-ionic surfactants which have a HLB valve of about 14 to less than 20, preferably about 15 to about 18, and which provide a stable foam when the surfactant is mixed with water and/or brine and a non-condensible gas.

DETAILED DESCRIPTION OF THE PREFERRED EMBODIMENTS

Figure 1:
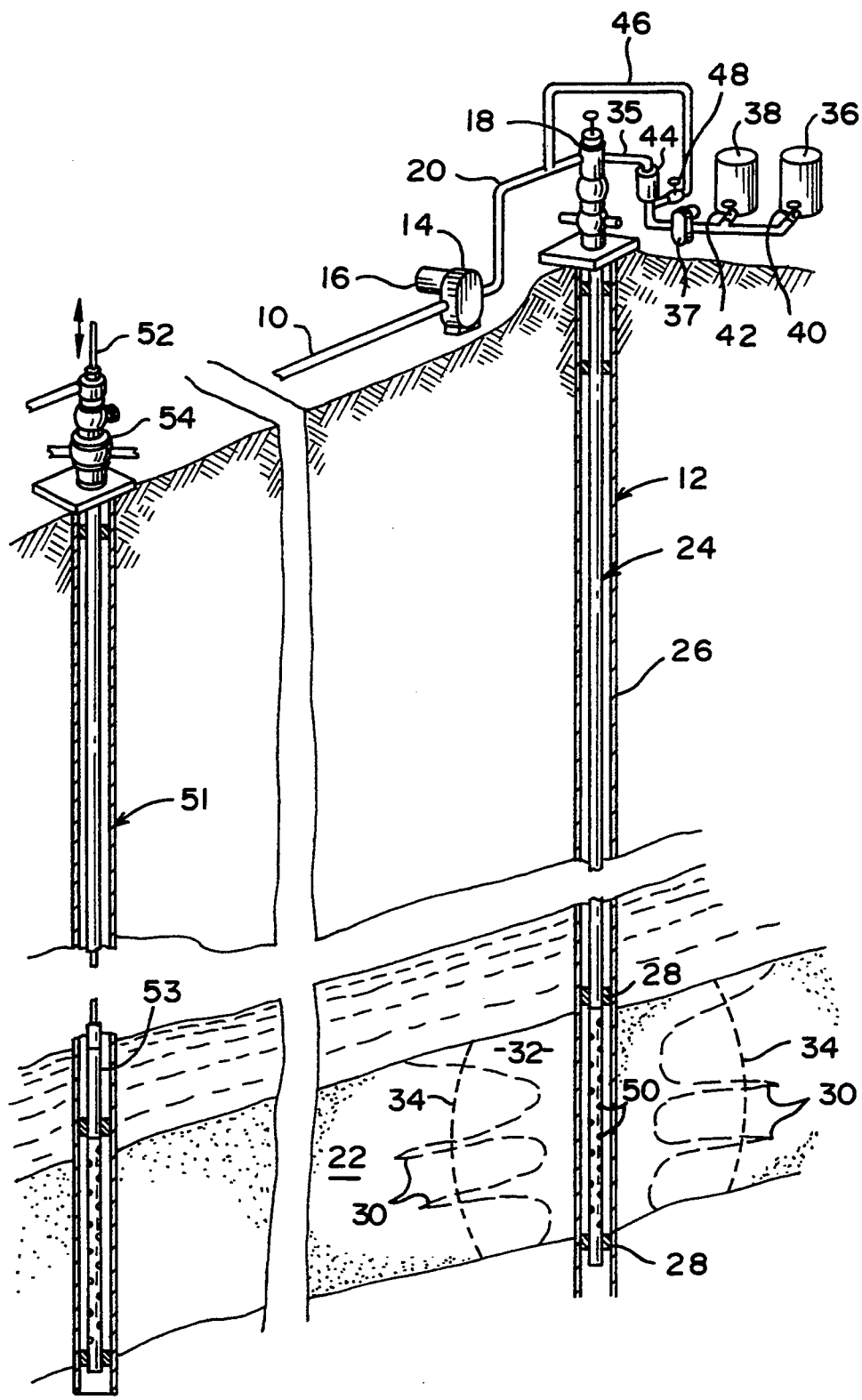
FIG. 1 illustrates a system in which the process of the present invention can be employed.

The present invention relates to a method for enhancing recovery of petroleum from oil-bearing formations, preferably a carbonate formation comprising limestone and/or dolomite. The method utilizes a foam-forming composition which can be employed with a non-condensible gas.

The foam-forming composition employed in the present invention comprises at least one non-ionic surfactant, preferably in admixture with water, where the surfactant is present in the amount effective to form a foam upon mixing of the foam-forming composition with a non-condensible gas and, optionally, water.

The surfactants according to the present invention are those non-ionic surfactants which have a hydrophilic-lipophilic balance (HLB) value of about 14 to less than 20 and which are capable of providing a stable foam when the surfactant is mixed with water and a non-condensible gas. Preferably, the surfactant has an HLB value of about 15 to about 18, most preferably about 16.

Experimental measurement of HLB is a tedious operation which is known in the art. Moreover, it is well established that for ethoxylated non-ionics, an approximation of the HLB value can be provided by the following equation:

$$HLB = (\text{Wt \% Ethylene oxide})/5$$

Accordingly, the surfactants employed in the present invention include those compounds containing above about 60 wt. % ethylene oxide. The hydrophobic portion of the compound can be selected from a wide variety of possibilities with the proviso that the surfactant is capable of forming a stable foam.

The stability of the foam produced can be illustrated by the Resistance Factor determined in a coreflood test. This Resistance Factor is defined as:

$$\frac{P \text{ across the core with foam present}}{P \text{ across the core with gas and brine}}$$

The greater the value for the Resistance Factor, the more stable the foam present in the core. In the context of the present invention, the generation of a Resistance Factor greater than about 5 once a threshold flow rate is reached, indicates the presence of a stable foam.

Three classes of non-ionic surfactants which are preferably employed in the present invention include:

(1) Ethoxylates of random secondary alcohols of the general formula:

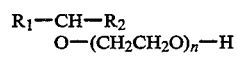

where $R_1$ and $R_2$ are straight-chain hydrocarbyl radicals having a total number of carbons in the range of 9–16, preferably 12–15, and the value of n ranges from about 12–30, preferably 20–30.

(2) Alkylphenol ethoxylates of the general formula:

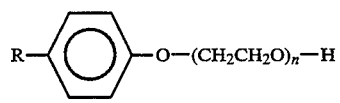

where R is a $C_8$ or $C_9$ chain. Preferably, where R is $C_8$, the chain can be branched, e.g., from diisobutylene, or can be straight-chain with random attachment along the chain. Specific examples employ the $C_8$ chain in the para-position and a linear chain in the ortho- and para-position in different ratios.

When R is $C_9$, the branched chain propylene trimer is preferred.

(3) Propoxylated, ethoxylated primary alcohols, for example, those compounds where the hydrophobe consists of a short chain, i.e., $C_6$–$C_{10}$, primary alcohol to which is added several, typically 3 moles of propylene oxide (PO) and then the amount of ethylene oxide to provide a product having the desired HLB value.

There is one class of non-ionic surfactants which is not part of the present invention, linear primary alcohol ethoxylates. Although they have the desired HLB values, they fail to provide a stable foam.

Specific examples of surfactants which can be employed include nonyl phenol ethoxylates having an average of 16 EO units, such as those available under the tradename Poly-Tergent B-500 from Olin Chemicals and random $C_{12}$–$C_{15}$ secondary alcohols with an average of 20 to 30 EO units such as those available under the tradenames Tergitol 15S-20 and Tergitol 15S-30 from Union Carbide.

The surfactants which can be employed in the present invention can be produced by methods which are known in the art and need not be described further here.

The foam-forming composition can be 100 percent active, i.e., composed solely of active components, or an be a dilute solution, i.e., where the surfactant is present in an amount as low as about 0.1 percent by weight. However, the foam-forming composition is preferably formed as a concentrate comprising an admixture of surfactant and water. In such a concentrate, the active components, e.g., at least one surfactant, are present in an amount of at least about 60% by weight, preferably about 60 to about 95 percent by weight. In use, the concentrate is diluted with water.

The foam-forming composition of the present invention can also include corrosion inhibitors which usually precipitate out with anionic surfactants because they are traditionally cationic compounds.

The foam-forming composition used in the present invention may also contain minor amounts of other surface active agents. For example, co-surfactants, such as amphoteric surfactants, as well as scale inhibitors, such as AOS dimers and chelating agents, may be present. The total amount of these additional surface active agents is preferably not greater than about 5% by weight of the at least one non-ionic surfactant.

The water which can be effectively employed within the present invention (in both forming and diluting the concentrate) can include water from any natural source, including a brine ranging in concentration of dissolved solids up to about 20% by weight depending on the reservoir temperature.

The non-condensible gas which can be employed includes any of those known in the art, e.g., carbon dioxide, nitrogen, methane, either alone or mixtures of hydrocarbons such as methane with any of ethane, propane, or butane, flue gas and the like. As was previously discussed, although these gases are referred to in the art as non-condensible, it is well known in the art that, in use, these gases are injected into the well formation under supercritical conditions.

The foam produced in the present invention is at least about 60% quality foam, preferably, about 60 to about 95% quality foam. In addition, the surfactant is preferably present in the liquid phase of the foam in an amount of about 0.1 to about 1 percent by weight, preferably about 0.2 to about 0.5% by weight.

It is to be understood by those skilled in the art that this composition can be used either in cyclic ("huff and puff") or drive recovery methods under either miscible or immiscible conditions.

In using the foam-forming composition for the enhanced recovery of petroleum products, the foam may either be preformed or formed "in situ" (i.e., through introduction of alternate slugs of gas and form-forming composition in the formation). In either method, any of the procedures known in the art for injecting a foam into a formation may be employed.

In a preferred embodiment, a preformed foam is at least periodically injected into the formation. Desirably, the foam is preformed in the well tubing or formed on the surface before the foam reaches the formation.

A source of gas is supplied at a relatively high pressure (which is below the fracturing pressure of the reservoir formation) to an injection well. In practice, this may be a central well flowing radially outward to a group of producing wells surrounding the injection well. Alternatively, the injection well may be one of several in a line capable of creating a front for a line-drive of oil through the formation to one or a line of producing wells.

In the figure, a single injection well and a single producing well are illustrative of a system which can utilize the present invention. For illustrative purposes, a compressor 14 driven by a motor 16 supplies the gas at a desired pressure to well 12 through the wellhead 18 and injection pipe 20. The gas is conducted to the desired reservoir strata, such as earth formation 22, through an injection pipe string 24 within casing 26. Injection string 24 may be isolated within wellbore 12 in casing 26 by packers 28 above and below formation 22.

As indicated above, the permeability of nearly all sedimentary earth formations that form a petroleum reservoir, such as 22, are inherently inhomogeneous to flow of connate fluids (i.e., water, oil and gas). Each of these fluids tends to flow selectively in permeable channels that have the least resistance to their flow. The resistance to flow of each fluid primarily depends on its viscosity either alone or relative to the other fluids and the capillary forces due to the pore size distribution of the rock. Typically, the resulting rock permeability for flow of each fluid is different in each formation.

Since gases are more mobile than either oil or water, or their mixtures, injected gas in general tends to flow through more permeable gas zones or strata and forms "fingers" 30 in formation 22 as indicated by the dashed lines. This gas flow tends to by-pass "tighter" or less-permeable zones wherein the oil-permeable passages are smaller or the oil is more tightly bound to the surface of the rock. In particular, the oil may be in contact with, or partially bound to, clay or shale material that over- or under-lies the reservoir or are within the limestone rock of the formation that forms the permeable and entrapping oil channels of the reservoir. Thus, "fingering" as indicated by area 32 at the top of formation 22, generally develops so that large portions of the oil are not contacted by the injected gas. As a result, gas may flow predominantly through the lower-resistance paths, gas channels 30 and 32, even where such paths include substantial volumes of movable oil and connate water near such paths. It is accordingly important to form a stable foam in these channels without permanently blocking or decreasing the mobility of substantial volumes of such entrapped oil. Thus, it is possible with the foams formed by the composition of the present invention to maintain the desired injection profile for the drive gas to produce a piston-like movement of oil through the formation, as indicated generally by dotted line 34.

To correct the distortion of the injection profile approximate front 34, foam-forming components of this invention are added to the injected gas stream through injection line 35. For this illustration, surfactant diluted with water or brine is supplied by tanks 36 and 38 through valves 40 and respectively, by metering pump 37 to foam generator 44 and then to injection line 35. Foam may be supplied to the formation by forming it in generator 44 with gas before injection into wellhead 18. For this purpose, a portion of the injection gas flows from line 20 to generator 44 through line 46 under control of valve 48 to develop the desired foam quality. Foam may also be formed in injection line 24 before contact with formation fluids, as by flow of surfactant solution and gas through perforations 50 in the lower end of tubing 24. Foam so generated upon injection into the reservoir preferentially flows to gas-permeable channels 30, 32. It effectively blocks them so that gas is then diverted to oil-rich portions of the formation. As indicated, the non-condensible gas is thus made to move in a relatively piston-like manner to displace reservoir fluids.

In the present illustration, oil is produced from an adjacent producing well such as 51, by pump 53 operating through sucker rods 52 through wellhead 54. The surfactant composition prepared in accordance with the present invention is preferably supplied as a concentrated liquid which is then diluted with injection brine. The solution is then pumped from tanks 36 and 38, and metered by pump 37 through line 35 at a desired rate to contact gas flowing in wellhead 18 or injection string 24.

The process of the present invention has some important advantages over the traditional surfactants. For example, in a steam foaming process, the use of alpha olefin sulfonates requires a surfactant concentration in the liquid phase of the foam of at least about 0.5% by wt. However, the present non-ionic surfactants are effective at levels as low as 0.1 wt. % in the liquid phase.

In addition, the foam generated and formed from the composition of the present invention has good stability, i.e., both thermal and hydrolytic stability, as well as being relatively insensitive to oil, brine, and low pH environments.

The following examples illustrate advantages that can be associated with the present invention and are to be understood to be illustrative and in nowise limitive.

EXAMPLES

Example 1—Foam Stability

As discussed above, the stability of the foam can be illustrated by the Resistance Factor which was determined from a standard coreflood of a carbonate core. In particular, this coreflood was performed using the following injection sequence:

(1) The initial waterflood; (2) saturation with live oil; (3) waterflood to $S_{or}$; (4) injection of $CO_2$; (5) simultaneous injection of $CO_2$ and brine at different rates and proportions: (6) injection of brine alone; (7) injection of $CO_2$ and surfactant in a 4:1 ratio at different rates; (8) displacement of the foam with brine; (9) injection of $CO_2$ and surfactant in a 3:2 ratio at different rates; and (10) displacement of the foam with $CO_2$.

Floods 1-3 were performed using two non-ionic surfactants according to the present invention and the results associated therewith are illustrated in Table 1. In Table 1, surfactant A was Tergitol 15S-20 and B was a nonyl phenol ethoxylate having an average of 16 EO units.

TABLE 1

| Flood-Surfactant | Concentration wt. % | Foam Quality | Flow Rate cc/hr | Flow Rate (ft/day) | Resistance Factor |
|---|---|---|---|---|---|
| 1-A | 0.5 | 60 | 5 | | 14 |
| | | 80 | 5 | | 16 |
| | | 80 | 2.5 | | 19 |
| | | 80 | 1.25 | | 23 |
| 2-A | 0.2 | 80 | 5 | | 0.5 |
| | | 80 | 10 | | 7.1 |
| | | 80 | 15 | | 7.7 |
| | | 60 | 2.5 | | 0.8 |
| | | 60 | 5 | | 1.8 |
| | | 60 | 10 | | 9.2 |
| 3-B | 0.2 | 80 | 2.5 | (2.1) | 0.6 |
| | | 80 | 5 | (4.3) | 1.0 |
| | | 80 | 10 | (8.6) | 6.2 |
| | | 80 | 5 | (4.3) | 8.8 |
| | | 80 | 2.5 | (2.1) | 10.2 |
| | | 60 | 10 | (8.6) | 11.1 |
| | | 60 | 5 | (4.3) | 12.3 |
| | | 60 | 2.5 | (2.1) | 17.7 |

As can be seen from the results presented in Table 1, the foam produced from non-ionic surfactants according to the present invention generated a Resistance Factor greater than about 5 once the threshold flow rate was reached.

Comparative Example 2—Foam Stability

The Resistance Factors associated with 5 prior art surfactants were determined from a carbonate coreflood in both the presence and absence of oil. This coreflood was performed at an injection flow rate of both 2 ft/day and 10 ft/day. The results associated with this experiment are illustrated in Table 2.

TABLE 2

| Carbonate Core Resistance Factors at a Flow Rate of 10 ft/day* | | | |
|---|---|---|---|
| Surfactant | Presence of Oil | Absence of Oil | Foam Quality |
| OLOA 200 | 2.4 | 16.2 | 80 |
| Mirataine BB | 2.3 | 13.2 | 50/80 |
| Glycoside APG-350 | 1.6 | 11.8 | 80 |
| | 1.7 | — | 50 |
| Alipal CD-128 | 1.3 | 15.3 | 80 |
| $C_{12}$—$C_{14}$—$C_{16}$ AOSNa | 1.3 | 22.1 | 80 |

*at a lower flow rate of 2 ft/day, the resistance factors were in each case about 1.

In each case the Resistance Factor provided when oil was present in the core was significantly less than 5. Accordingly, a comparison of the Resistance Factors presented in Tables 1 and 2 illustrates that only the surfactants employed in the foam forming composition of the present invention provided a stable foam in a carbonate core containing oil.

Example 3—Adsorbance of the Surfactant

The adsorbance of several surfactants on a carbonate core was obtained using a standard recirculation adsorption determination method, such as that discussed in the article by J. H. Bae et al in the *Society of Petroleum Engineers Journal*, October 1977, page 357.

Figure 2:
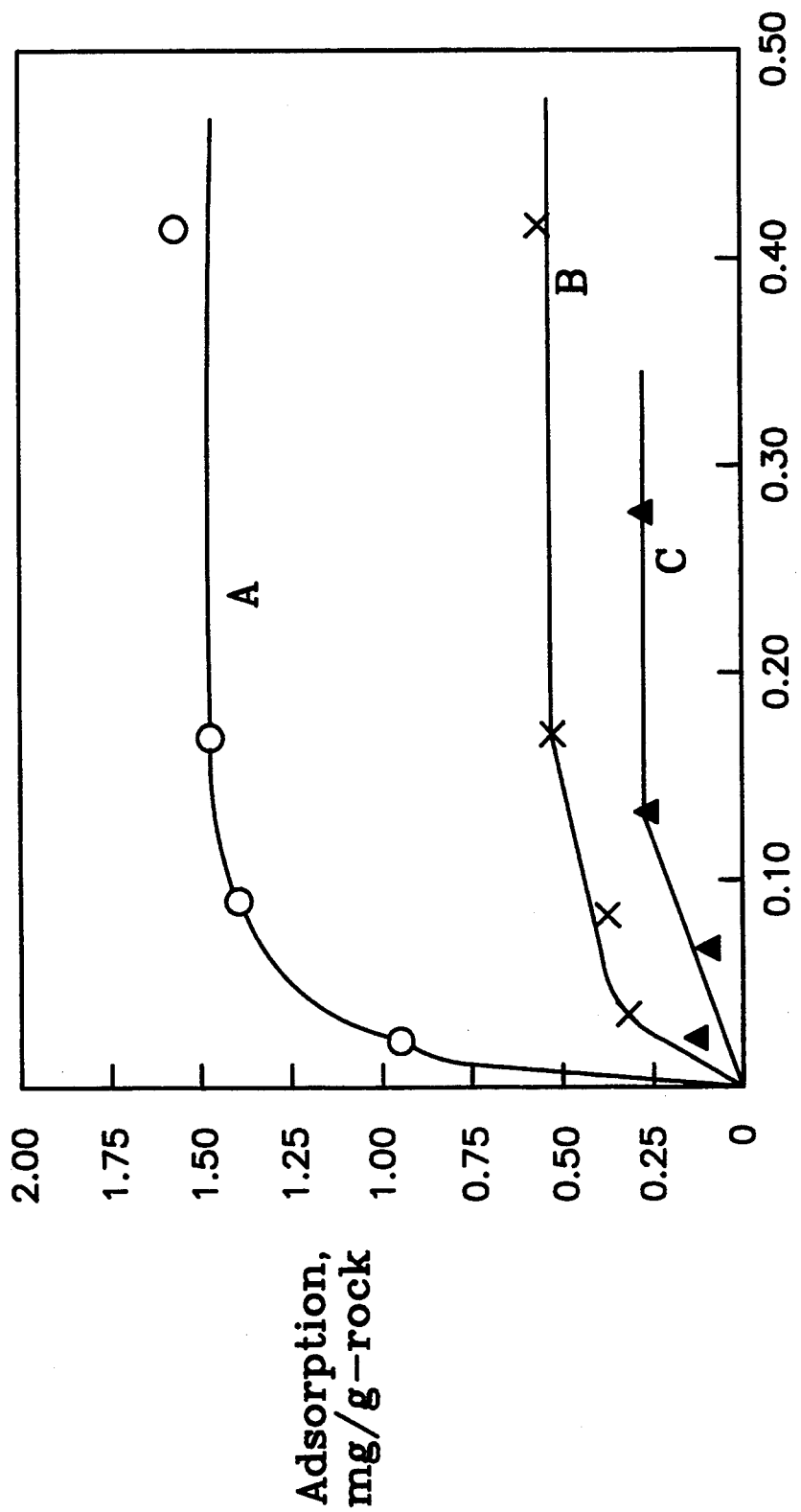
FIG. 2 illustrates the superior adsorption which can be associated with the present invention.

In this experiment, adsorption was measured for several surfactant concentrations at 130° F. The results in FIG. 2 which show that (C) the non-ionic surfactant designated B in Example 1 had much lower adsorption than either (A) $C_{12}$-$C_{14}$-$C_{16}$ AOS or (B) Alipal CD-128.

While the invention is described in terms of various preferred embodiments, the artisan will appreciate that various modifications, substitutions, omissions, and changes may be made without departing from the spirit thereof. Accordingly, it is intended that the scope of the present invention be delineated solely by the scope of the following claims including equivalents thereof.

What is claimed is:

1. A method of enhancing recovery of petroleum from an oil bearing formation during injection of non-condensible gas comprising at least periodically injecting a foam into said oil bearing formation, said foam comprises a mixture of a gas phase consisting essentially of non-condensible gas and a water phase containing an effective amount of at least one non-ionic surfactant having an HLB value of about 14 to less than 20 and which is selected from among ethoxylated alkyl phenols; ethoxylated linear secondary alcohols; propoxylated, ethoxlated primary alcohols and mixtures thereof.

2. The method of claim 1 wherein the foam is preformed either on the surface or in the well tubing.

3. The method of claim 1 wherein the non-ionic surfactant has an HLB value of about 15 to about 18.

4. The method of claim 1 wherein the non-ionic surfactant has an HLB value of about 16.

5. The method of enhancing recovery of petroleum according to claim 1 wherein the non-condensible gas is selected from $CO_2$, $N_2$, methane, mixtures of methane with any of ethane, propane, or butane, flue gas and mixtures thereof.

6. The method of enhancing recovery of petroleum according to claim 1 wherein the oil bearing formation comprises a carbonate formation.

7. The method of claim 6 wherein the carbonate formation comprises limestone, dolomite, or mixtures thereof.

8. The method of claim 7 wherein the petroleum comprises light oil.

9. The method of claim 8 wherein the non-ionic surfactant has an HLB value of about 15 to about 18.

10. The method of enhancing recovery of petroleum according to claim 1 wherein the water comprises a brine.

11. The method of enhancing recovery of petroleum according to claim 1 wherein the water phase of the foam further includes at least one additional component which is selected from among corrosion inhibitors, co-surfactants, scale inhibitors, and mixtures thereof.

12. The method of enhancing recovery of petroleum according to claim 11 wherein the total amount of the additional components is not greater than about 5 percent by weight of the at least one non-ionic surfactant.

13. The method of enhancing recovery of petroleum according to claim 1 wherein the foam is at least 60% quality and the non-ionic surfactant is present in the liquid phase in an amount of about 0.1 to about 1% by weight.

14. The method of enhancing recovery of petroleum according to claim 9 wherein the foam is at least 60% quality and the non-ionic surfactant is present in the liquid phase in an amount of about 0.1 to about 1% by weight.

15. A method of enhancing recovery of petroleum from an oil beating formation during injection of non-condensible gas comprising at least periodically injecting a foam forming composition into said oil bearing formation, said foam forming composition comprising an aqueous phase containing at least one non-ionic surfactant having an HLB value of about 14 to less than 20 and which is selected from among ethoxylated alkyl phenols; ethoxylated linear secondary alcohols; propoxylated, ethoxylated, primary alcohols and mixtures thereof and which is present in an amount effective to form a stable foam when mixed with the gas and water.

16. The method of claim 15 wherein the foam forming composition further comprises water.

17. The method of claim 16 where the at least one non-ionic surfactant has an HLB value of about 15 to about 18.

18. The method of claim 16 wherein the at least one non-ionic surfactant has an HLB value of about 16.

19. The method of enhancing recovery of petroleum according to claim 16 wherein the non-condensible gas is selected from among $CO_2$, $N_2$, methane, mixtures of methane with ethane, propane or butane, flue gases, or mixtures thereof.

20. The method of enhancing recovery of petroleum according to claim 16 wherein the foam which is formed is at least 60% quality and the non-ionic surfactant is present in the liquid phase in an amount about 0.1 to about 1% by weight.

21. The method of enhancing recovery according to claim 16 wherein the water comprises a brine.

22. The method of enhancing recovery according to claim 16 wherein the oil bearing formation comprises a carbonate formation.

23. The method of claim 22 wherein the carbonate formation comprises limestone, dolomite or mixtures thereof.

24. The method of claim 22 wherein the petroleum comprises light oil.

25. The method of claim 24 wherein the non-ionic surfactant has an HLB value of about 15 to about 18.

26. The method of enhancing recovery of petroleum according to claim 25 wherein the foam which is formed is at least 60% quality and the non-ionic surfactant is present in the liquid phase in an amount about 0.1 to about 1% by weight.

27. The method of enhancing recovery of petroleum according to claim 16 wherein the foam-forming composition further includes at least one additional component which is selected from among corrosion inhibitors, co-surfactants, scale inhibitors, and mixtures thereof.

28. The method of enhancing recovery of petroleum according to claim 27 wherein the total amount of the additional components is not greater than about 5 percent by weight of the at least one non-ionic surfactant.

* * * * *